United States Patent [19]

Wilson et al.

[11] 4,168,654

[45] * Sep. 25, 1979

[54] FLUID SUPPLY DISTRIBUTOR

[75] Inventors: John J. Wilson, Camden; Donald M. Rhoades, Logansport, both of Ind.

[73] Assignee: Logansport Machine Co., Inc., Logansport, Ind.

[*] Notice: The portion of the term of this patent subsequent to Aug. 9, 1994, has been disclaimed.

[21] Appl. No.: 784,949

[22] Filed: Apr. 5, 1977

Related U.S. Application Data

[62] Division of Ser. No. 695,595, Jun. 14, 1976, Pat. No. 4,040,338.

[51] Int. Cl.$^2$ .............................................. F01B 31/00
[52] U.S. Cl. ...................................... 92/106; 92/153; 137/580; 308/1 A
[58] Field of Search ....................... 92/106, 153; 91/1; 137/580; 279/4; 403/2, 328, 27, DIG. 8, 26; 308/1 A, 187

[56] References Cited

U.S. PATENT DOCUMENTS

| 2,536,565 | 1/1951 | Östergren | 92/106 |
|---|---|---|---|
| 2,835,227 | 5/1958 | Gamet | 92/106 |
| 3,020,057 | 2/1962 | Gamet | 92/106 |
| 3,417,672 | 12/1968 | Sampson | 92/106 |
| 3,986,437 | 10/1976 | Lioux | 92/106 |

Primary Examiner—Abraham Hershkovitz
Attorney, Agent, or Firm—Mason, Kolehmainen, Rathburn & Wyss

[57] ABSTRACT

A fluid supply distributor communicates fluid from a stationary fluid source to a rotating hydraulic motor. The distributor includes a housing with main ports for connection to high and low pressure at the source. A shaft rotating in the housing is attached to the motor and includes motor ports for connection to the rotating motor. A sleeve in the housing surrounds the shaft, and the sleeve and shaft define interfacing sealing surfaces. The housing, the sleeve, and the shaft include passages for communicating fluid between the main ports and the motor ports. The sleeve is normally retained in a stationary position, but is released to rotate within the housing should the shaft seize within the housing. The passages include spaced supply grooves at the sealing surfaces connected to the main ports and thus maintained at different pressures. Bearing assemblies adjacent the sealing surfaces mount the shaft for rotation and are lubricated in a balanced fashion by leakage of fluid between the sealing surfaces from both supply grooves.

3 Claims, 5 Drawing Figures

FLUID SUPPLY DISTRIBUTOR

This is a divisional application of application Ser. No. 695,595, filed June 14, 1976, now U.S. Pat. No. 4,040,338.

The present invention relates to a new and improved fluid supply distributor for supplying pressurized fluid from a source to a rotating hydraulic motor of the type employed with an industrial machine tool.

Large industrial machine tools such as lathes typically employ a rotating hydraulic motor to actuate a rotating workpiece holder such as a chuck or a collet. Normally the rotating motor is operated by pressurized hydraulic fluid from a stationary source. It is necessary to provide an interconnection between the stationary source and the rotating motor. Typically, a fluid supply distributor is used to perform this function. For example, one typical fluid supply distributor is disclosed in U.S. Pat. No. 3,417,672.

Fluid supply distributors of the type used in the past include an outer stationary housing having ports for connection to a fluid pressure source. A stem or shaft is mounted for rotation within the housing of the distributor, and the stem or shaft typically either comprises a part of or is connected to the rotating cylinder of the hydraulic motor. The piston of the motor rotates with and reciprocates in the cylinder and operates the workpiece holder.

The mounting of the shaft for rotation within the housing provides problems in fluid supply distributors used in the past. In one arrangement, the housing and shaft are provided with surfaces forming journal bearings lubricated by leakage fluid. In another arrangement, bearing assemblies may be provided. In either case, it may happen that the bearing assemblies or bearing surfaces malfunction due to overheating, inadquate lubrication, or the like, with the result that the shaft is seized within the housing. Since the rotary motor and the shaft or stem are continuously rotated by the machine tool, seizure of the shaft can result in rotation of the housing of the fluid supply distributor, and of fluid supply hoses and other equipment connected thereto. Consequently, seizure can lead not only to destruction of the distributor but to a dangerous condition.

Among the important objects of the present invention are to provide a new and improved fluid supply distributor; to provide a distributor wherein the rotation of the stationary housing upon seizure of the rotating shaft is prevented; to provide a distributor wherein destruction of the entire unit does not result from seizure of the rotating shaft; to provide a fluid supply distributor having an improved bearing lubrication system; to provide a fluid supply distributor capable of withstanding high speed and heavy loads; and to provide improvements in the structural features, the cost, and the safety of fluid supply distributors.

Briefly, in accordance with the above and other objects of the present invention, there is provided a fluid supply distributor for communicating fluids at high and low pressures between a stationary fluid source and a rotating hydraulic motor. The distributor includes a stationary housing with main ports for connection to the source, together with a rotating shaft mounted in the housing and having motor ports for connection to the rotating hydraulic motor. A sleeve is interposed between the housing and the shaft, and interfacing sealing surfaces are defined on the interior surface of the sleeve and the exterior surface of the shaft. Passages within the distributor intercommunicate the main ports and the motor ports. In accordance with an important feature of the invention, the sleeve is normally maintained in a stationary position within the housing; however, upon seizure of the shaft, the sleeve is able to break away from the housing and rotate with the shaft while the housing remains stationary.

Fluid is intercommunicated from stationary passages in the housing assembly to passages in the rotating shaft by means including a pair of circular grooves defined in one of the sealing surfaces. A pair of bearing assemblies adjacent the bearing surfaces support the shaft for rotation and are lubricated by leakage flow along thhe sealing surfaces from the grooves. In accordance with an important feature of the invention, each bearing assembly is not only lubricated by direct flow from an adjacent, first groove, but also by leakage flow from the non-adjacent groove supplied by leakage collection groove and a lubricating passage. In this manner, both bearing assemblies are provided with equalized lubrication flow regardless of the pressurization conditions of the supply grooves.

The above and other objects and advantages and novel features of the present invention will become apparent from the following detailed description of a preferred embodiment of the invention illustrated in the accompanying drawings, wherein.

Figure 1:
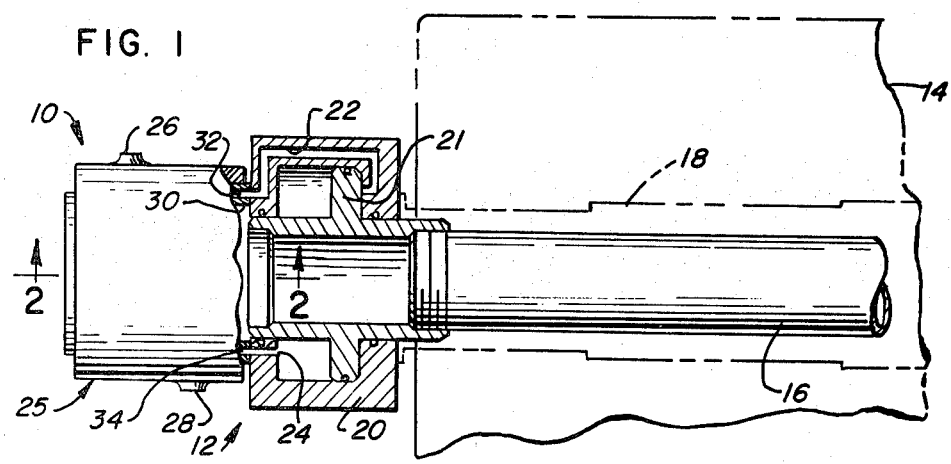
FIG. 1 is a simplified diagrammatic illustration of portions of a machine tool, a rotating hydraulic motor, and a fluid supply distributor constructed in accordance with the present invention.

Having reference now to the accompanying drawings, in FIG. 1 there is illustrated in simplified and diagrammatic form a fluid supply distributor generally designated as 10 associated with a rotating hydraulic motor 12 and a machine tool 14 indicated in broken lines. The machine tool 14 includes a conventional collet or chuck workpiece holder (not shown) operated by reciprocation of an actuating tube 16 mounted concentrically within a rotating spindle 18 of the tool. The rotating hydraulic motor 12 functions to move the rotating actuating tube 16 in opposite directions along its axis, while the fluid supply distributor 10 communicates fluid between a stationary fluid source and the rotating motor 12.

As indicated in simplified form in FIG. 1, the rotating hydraulic motor 12 includes a rotating cylinder 20 typically attached for rotation with the spindle 18 and enclosing a rotating piston assembly 21 attached to the tube 16. A pair of passages 22 and 24 formed in the cylinder 20 permit selective pressurization of opposite sides of the piston assembly 21 in order to reciprocate the piston assembly 21 and the tube 16 thereby to operate the workpiece holder.

The fluid supply distributor 10 includes a stationary housing assembly generally designated as 25 including a pair of main or supply ports 26 and 28 adapted to be connected by suitable conduits and valves with high pressure and low pressure fluids supplied from a stationary source. Rotatably mounted within the housing assembly 25 is a shaft or stem 30 attached to the rotating cylinder 20. Passages 32 and 34 in shaft 30 communicate with passages 22 and 24 in the cylinder. The illustrated arrangement is of the so-called "through hole" type and the shaft 30, the piston assembly 21 and the tube 16 are hollow to permit a workpiece such as bar stock or the like to be fed therethrough.

With reference now to FIGS. 2-5, the fluid supply distributor 10 of the present invention is illustrated in more detail. The housing assembly 25 includes a stationary housing including a body member 36 to which are fastened a pair of end covers 38 and 40. In accordance with an important feature of the invention, the housing assembly 25 further includes a sleeve or intermediate shaft 42 within which the shaft 30 is received. A pair of bearing assemblies 98 and 100 mounted between the shaft 30 and the sleeve 42 support the shaft 30 for rotation within the housing assembly 25. In the event of a seizure of the shaft 30 to the sleeve 42, the sleeve 42 is able to break away from the stationary housing and rotate without destroying the stationary housing or creating a dangerous condition.

More specifically, the assembled body 36 and end covers 38 and 40 define a generally annular internal recess within which the cylindrical sleeve 42 is received. The interior surface of sleeve 42 defines a generally cylindrical sealing surface 44 interfacing with a sealing surface 46 defined upon the exterior of the shaft 30. Sealing surfaces 44 and 46 are spaced apart slightly from one another so that they do not contact one another and so that a restricted path between the surfaces for controlled leakage of fluid for lubrication is provided.

At axially spaced locations along the interfacing sealing surfaces 44 and 46 there are disposed a pair of rotary fluid interconnections 48 and 50. In the illustrated arrangement, the interconnection 48 includes a circular supply groove 52 formed in surface 44 and an aligned port 54 formed in surface 46. Similarly, the rotary fluid interconnection 50 includes a supply groove 56 and a port 58.

In order to communicate fluid from the main or supply ports 26 and 28 to the rotary fluid interconnections 48 and 50, the body 36 includes a pair of passages 60 each extending radially inward from one of the supply ports. A pair of passages 62 normally aligned with passages 60 extend radially inwardly through the sleeve 42 to the grooves 52 and 56. Only a single passage 60 and passage 62 are illustrated in the drawings, and appear in FIGS. 2 and 4.

Fluid supplied through the supply passages 60 and 62 to the grooves 52 and 56 communicates with the passages 32 and 34 respectively by means of the ports 54 and 58. As illustrated in FIG. 1, the passages 32 and 34 communicate with passages 22 and 24 in the rotating hydraulic cylinder 20 of motor 12. In the illustrated arrangement, the grooves 52 and 56 also communicate with additional ports 64 and 66 and additional passages 68 and 70 formed in shaft 30. Fluid from these additional passages 68 and 70 may be supplied to control the operation of check valves associated with the rotating hydraulic motor 12 in conventional manner.

As indicated above, in accordance with one feature of the invention the sleeve 42 is releasably retained in a stationary position. Having reference now to FIG. 4, there is illustrated one arrangement for releasably retaining the sleeve 42 fixed to the housing 25. A fitting 72 is threaded into each of the main or supply ports 26 and 28. A sealing and coupling bushing or element 74 is captured in each of the passages 60 by the fittings 72. The bushing is provided with a pair of seals 76 and 78 at opposite ends of a central axial opening 80. Consequently, fluid passes through the opening 80 between the passages 60 and 62, while the seals 76 and 78 prevent the admission of fluid to the region between the body 36 and the sleeve 42.

Figure 4:
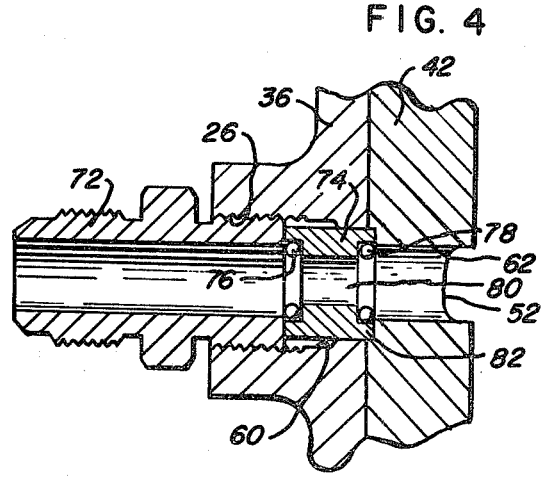
FIG. 4 is a fragmentary, sectional view on an enlarged scale taken along the line 4—4 of FIG. 3.

As can be seen with reference to FIG. 4, the innermost end portion of the bushing 74 is received in an enlarged portion or recess 82 in the outer surface of the sleeve 42. Engagement of the bushing in the recess 82 serves releasably to retain the sleeve 42 in position. The bushing may be fabricated of any frangible material such as a suitable metal or plastic so that when subjected to a predetermined stress, the bushing will fracture or shear, thereby permitting rotation of the sleeve 42 within the housing.

Figure 5:
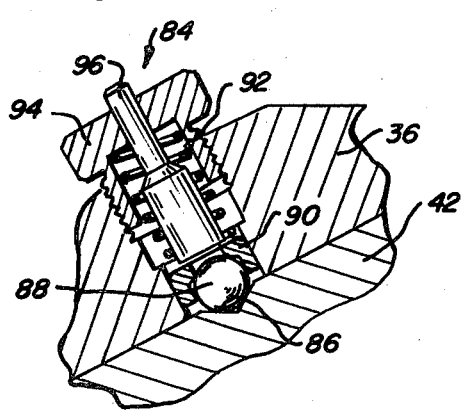
FIG. 5 is a fragmentary, sectional view on an enlarged scale taken along the line 5—5 of FIG. 3.

In FIG. 5 there is illustrated an indicating arrangement generally designated as 84 for providing an indication of movement of the sleeve 42, and also, if desired, for providing or augmenting the releasable retention of the sleeve 42 within the housing. A recess 86 is formed in the outer surface of the sleeve 42, and a detention device indicated as a ball 88 held by a retainer 90 is biased into the recess 86 by means of a spring 92 captured beneath an adjustable cap 94. The ball 88 tends to retain the sleeve 42 in a stationary position, and the degree of the retention force is determined by the configuration of the recess 86 and by the force applied to the ball by the spring 92.

When the retention force is overcome and the sleeve 42 rotates within the housing, the ball is lifted by camming action of the base of the recess 86. An indicator element 96 is lifted in response to outward movement of the ball to project from the cap 94 and provide a readily visible indication to the operator of movement of the sleeve 42.

In order to permit high speed operation of the rotating hydraulic motor 12 and to permit operation under heavy loads, the sealing surfaces 44 and 46 do not contact one another, but rather are accurately machined to provide for restricted and controlled leakage flow of pressurized fluid from the grooves 52 and 56 for lubrication purposes. For example, in the illustrated embodiment the surfaces are spaced apart in the radial direction by a distance in the range of 0.0014 inch minimum and 0.0018 inch maximum. The circular bearing assemblies 98 and 100 are sandwiched between the shaft 30 and the sleeve 42 adjacent the opposite ends of the sealing surfaces 44 and 46 in order to position the shaft 30 and to support the shaft for rotation.

In accordance with an important feature of the invention, there is provided an arrangement for lubrication of the bearing assemblies 98 and 100 in a balanced fashion regardless of pressure differences existing between the grooves 52 and 56. Each assembly is lubricated by direct leakage flow from the adjacent groove 52 and 56. Thus, assembly 98 is lubricated by flow from groove 52 across a segment 44A of the sealing surface 44. Similarly, assembly 100 is lubricated by leakage flow across a segment 44B of the sealing surface 44.

During normal operation of the fluid supply distributor 10, one of the supply ports 26 and 28 is supplied with fluid at a relatively high pressure while the other port acts as a return for fluid at a relatively low pressure. Consequently, one of the grooves 52 and 56 contains fluid at a substantially higher pressure than the other and direct leakage lubrication across sealing surface segments 44A and 44B is unbalanced in that the assembly adjacent the higher pressure groove receives a larger flow of lubricating fluid than the assembly adjacent the lower pressure groove.

In order to provide balanced lubrication, each bearing assembly 98 and 100 is also lubricated by means of leakage flow from the nonadjacent groove. More specifically, a pair of leakage collection grooves 101 and 102 are defined in the sleeve 42 between the supply grooves 52 and 56. Fluid flows from groove 52 over a sealing surface segment 44C to the groove 101 and fluid flows over sealing surface segment 44D from the groove 56 to the groove 102. Slingers are provided in the inner surface 46 for facilitating the collection of leakage fluids within the grooves 101 and 102.

Fluids collected within the grooves 101 and 102 are communicated to the bearing assemblies 98 and 100 by a pair of passages 104 and 106. Specifically, passage 104 extends through the sleeve 42 from the groove 101 to the bearing assembly 100, while passage 106 extends from the groove 102 to the bearing assembly 98.

Preferably, in order to provide balanced lubrication, the sealing surface segments 44A, 44B, 44C and 44D are all of approximately the same length. Thus, for any given pressure conditions, fluid flowing across segments 44A and 44C from groove 52 in opposite directions to the assembly 98 and groove 101 respectively will be approximately equal in amount. Similarly with respect to the groove 56, approximately equal flows occur across the segments 44B and 44D to the assembly 100 and the groove 102. Since assemblies 98 and 100 both receive leakage flows from both grooves 52 and 56, the quantity of lubricating fluid supplied to both bearing assemblies is essentially equal.

Figure 2:
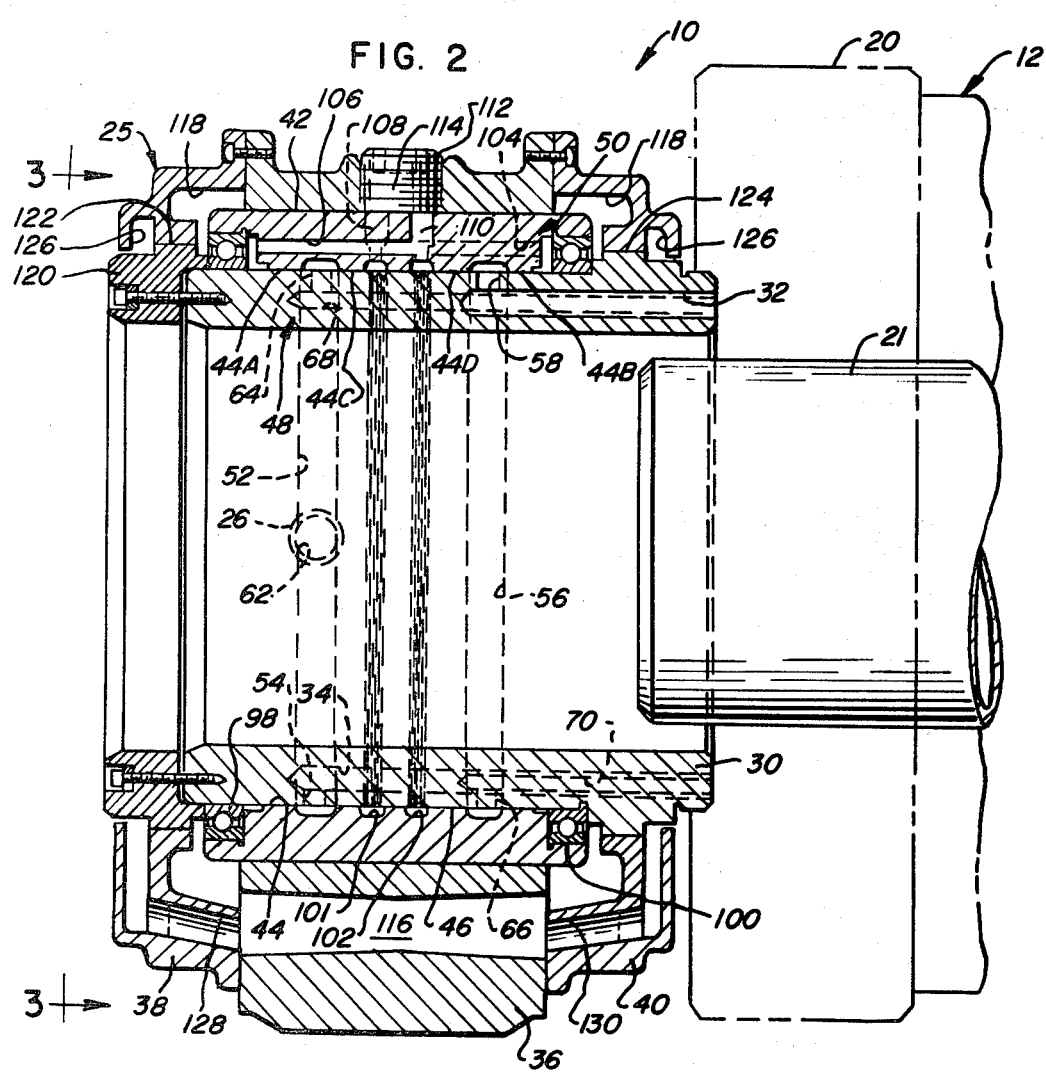
FIG. 2 is a sectional view on an enlarged scale of the fluid supply distributor taken along the line 2—2 of FIG. 1, but illustrating the distributor in detail rather than in simplified form.
Figure 3:
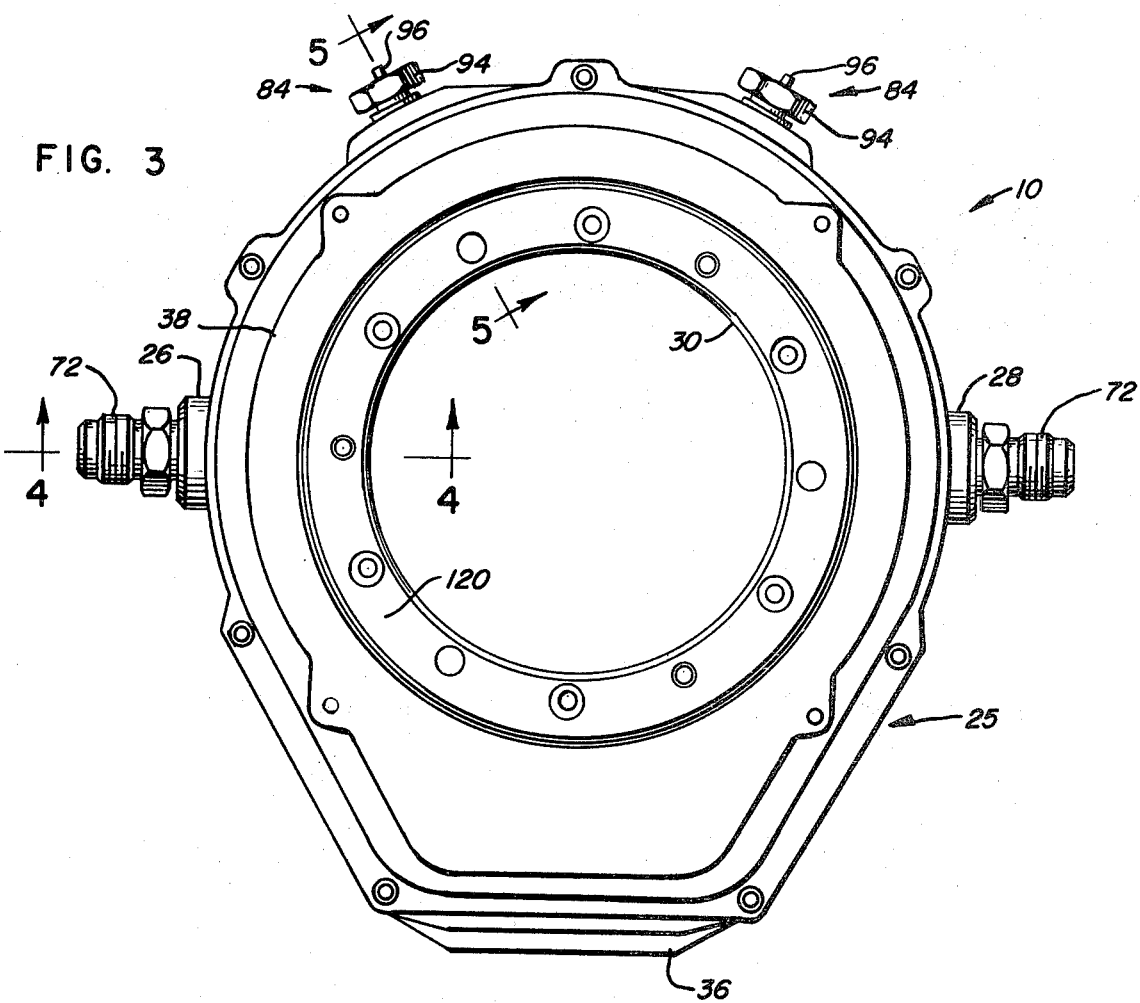
FIG. 3 is an end, elevational view of the distributor taken from the line 3—3 of FIG. 2.

Under some conditions it may be desirable to provide external lubrication of the bearing assemblies 98 and 100. For this purpose, the passages 104 and 106 are communicated with passages 108 and 110 extending radially outward through the sleeve 42. These passages 108 and 110 are accessible through an opening 112 in the body 36. As illustrated in FIG. 2 this opening is normally closed by a plug member 114.

During operation of the fluid supply distributor 10, the sealing surfaces 44 and 46 and the bearing assemblies 98 and 100 are continuously lubricated by controlled leakage fluid flow. The body 36 is provided with a sump or cavity 116 for collecting fluid flowing through the bearing assemblies 98 and 100. Although not illustrated in the drawings, the sump 116 is provided with an outlet for discharge of fluid.

In order to channel fluid from the assemblies 98 and 100 to the sump 36, the outer side of each bearing assembly communicates with a circular fluid collection passage or chamber 118. One of the passages 118 is defined by end cap 38 in combination with a bearing retainer 120 attached to and rotatable with the shaft 30. The other passage 118 is defined within the end cap 40. As illustrated in FIG. 2, the lowermost portions of the passages 118 open into the sump 116.

It is desirable to prevent the leakage of fluid from the passages 118 outwardly in the axial direction between the end cap 38 and bearing retainer 120, and the end cap 40, and the shaft 30. Advantageously, this is accomplished without the use of resilient seal members or the like which would not only add expense but also would create a frictional loading of the rotation of shaft 30. In accordance with the invention, this sealing is provided by the use of secondary sealing regions 122 and 124 defined between the end caps 38 and 40 and the retainer 120 and the shaft 30 respectively. The tolerances of these regions 122 and 124 are selected so that free rotation is attained and so that only limited fluid flow takes place across these regions. If desired, the surfaces of regions 122 and 124 may be machined with grooves (not shown) to provide a labyrinth seal.

Secondary leakage flow travelling across sealing regions 122 and 124 is collected in secondary leakage collection chambers or passages 126 defined in the end caps 38 and 40 axially outwardly of the main collection passages 118. The lowermost sections of these passages also communicate with the sump 116. The end caps include wall portions 128 and 130 separating the lowermost portions of the collection passages 118 and 126 (FIG. 2). These walls act as shields to prevent the splashing of fluids thrown directly from the bearing assemblies 98 and 100 into the secondary collection passsages 126 so that these fluids do not escape from the end caps 38 and 40.

In operation of the fluid supply distributor 10, assume that supply port 26 is interconnected with a source of fluid at a relatively high pressure and that supply port 28 is interconnected with a region of low pressure. Pressurized fluid enters the port 26 and flows to groove 52 through passages 60 and 62 by way of bushing 74 (FIG. 4). Groove 52 is pressurized throughout its circular extent and as a result passages 34 and 68 in the rotating shaft 30 are pressurized. Consequently, passage 24 (FIG. 1) in the rotating cylinder 20 is pressurized in order to bias the piston assembly 21 in the direction to extend the actuating tube 16.

Low pressure fluid is returned from the opposite side of piston assembly 21 through the passage 22 to passage 32 in rotating shaft 30. This low pressure fluid is directed through port 58 into groove 56 from which it flows via passages 60 and 62 to port 28.

Pressurized fluid in restricted and controlled quantities flows from groove 52 in opposite directions across leakage paths underlying sealing surface portions 44A and 44C. The flow across portion 44A directly lubricates bearing assembly 98. The flow across portion 44C enters collection groove 101 and flows through passage 104 to lubricate bearing assembly 100. Consequently, both bearing assemblies 98 and 100 are provided with equalized lubrication flows. Fluid flowing through the bearing assemblies 98 and 100 is collected in passages 118 and 126 from which it flows to the sump 116.

Under some conditions it may occur that the sealing surfaces 44 and 46, or perhaps the bearing assemblies 98 and 100, exhibit abnormally high friction and cause shaft 30 to become seized. For example, the lubrication of the surfaces and bearing assemblies may be insufficient due to a failure of the source of high pressure fluid, or a fragment of a worn bearing or contaminants in the fluid may become lodged between the sealing surfaces 44 and 46. Under these circumstances, the shaft 30, which is rotated by the spindle 18, applies a substantial rotational torque to the sleeve 42. The sleeve 42 is capable of breaking away from the housing assembly 25 due to deflection of the ball 88 and/or due to fracture or shearing of the bushing 74. When this occurs, the sleeve 42 rotates together with the shaft 30. The remainder of the housing is not damaged, and a dangerous abrupt rotation of the housing is prevented.

When sleeve 42 rotates, the indicator elements 98 are extended so that the operator of the machine is immediately apprised of the malfunction. Once the machine is shut down, it is a relatively simple and inexpensive matter to disassemble the fluid supply distributor 10 and reassemble it in proper working order after correcting the cause of the malfunction.

While the invention has been described with reference to details of the illustrated embodiment, it should be understood that such details do not limit the scope of the invention as defined in the following claims.

What is claimed and desired to be secured by Letters Patent of the United States is:

1. In a fluid supply distributor for a rotating hydraulic motor, the combination comprising:
    a stationary housing assembly;
    a shaft mounted for rotation in said housing assembly;
    interfacing generally cylindrical sealing surfaces formed on said housing assembly and shaft;
    said sealing surfaces being spaced apart to define restricted leakage flow regions therebetween;
    a pair of circular fluid supply grooves in one sealing surface;
    a pair of circular bearing assemblies interposed between said housing assembly and shaft adjacent said sealing surfaces and flanking said supply grooves;
    a pair of circular leakage fluid collection grooves in one sealing surface and flanked by said supply grooves;
    two supply passages in said housing assembly and communicating with said supply grooves for pressurizing said grooves at different pressures;
    two motor passages in said shaft and communicating with said supply grooves for applying said different pressures to the rotating hydraulic motor;
    a first of said supply grooves being located along said sealing surfaces between a first of said bearing assemblies and a first of said leakage grooves, and the second supply groove being located along said sealing surfaces between the second bearing assembly and the second leakage groove;
    each bearing assembly being lubricated by direct leakage flow from the adjacent supply groove; and
    a pair of lubrication passages interconnecting the first leakage groove to the second bearing assembly and the second leakage groove to the first bearing assembly for lubrication of each bearing assembly by leakage flow from the nonadjacent supply groove, said housing assembly further including a sleeve surrounding said shaft and defining one sealing surface; and means for releasably retaining said sleeve in a stationary position in said housing assembly and for permitting rotation of said sleeve within said housing assembly in response to seizure of said sealing surfaces.

2. The combination of claim 1, the leakage paths along said sealing surfaces between said supply grooves and said bearing assemblies and said leakage grooves all being approximately of the same length.

3. The combination of claim 1, further comprising a sump in said housing assembly, and collection passages for channeling fluid from said bearing assemblies to said sump.

* * * * *